United States Patent [19]

Oi

[11] Patent Number: 5,048,565
[45] Date of Patent: Sep. 17, 1991

[54] VALVE ASSEMBLY WITH CHECK VALVE FOR GAS CONTAINER

[75] Inventor: Akira Oi, Amagasaki, Japan

[73] Assignee: Kabushiki Kaisha Neriki, Japan

[21] Appl. No.: 490,404

[22] Filed: Mar. 8, 1990

[30] Foreign Application Priority Data

Mar. 10, 1989 [JP] Japan .................................. 1-58866

[51] Int. Cl.[5] ............................................ B65B 3/04
[52] U.S. Cl. ............................... 137/614.19; 137/322; 251/149.6; 141/18
[58] Field of Search ........................... 137/322, 614.19; 251/149.6, 149.8; 141/18

[56] References Cited

U.S. PATENT DOCUMENTS

| | | | |
|---|---|---|---|
| 2,283,970 | 5/1942 | Buttner | 137/322 |
| 2,620,817 | 12/1952 | Blaydes | 137/322 |
| 2,632,462 | 3/1953 | Selwyn | 137/322 |
| 2,645,241 | 7/1953 | Riede . | |
| 3,353,724 | 11/1967 | Johnston | 137/322 |
| 3,645,496 | 2/1972 | Rawlins | 137/322 |
| 3,924,654 | 12/1975 | Buller et al. | 137/322 |
| 4,069,686 | 1/1978 | Hoelman | 137/322 |
| 4,210,168 | 7/1980 | Yonezawa . | |
| 4,341,245 | 7/1982 | Daicho et al. | 141/18 |
| 4,402,340 | 9/1983 | Lockwood, Jr. | 137/322 |
| 4,476,892 | 10/1984 | Boyce | 251/149.8 |
| 4,776,562 | 10/1988 | Kalaskie et al. | 251/63.5 |
| 4,898,210 | 2/1990 | Nitta | 137/614.19 |

Primary Examiner—A. Michael Chambers
Attorney, Agent, or Firm—Bacon & Thomas

[57] ABSTRACT

A valve assembly with a check valve for a gas container has a check valve chamber formed in such a portion of a circumferential wall of a stop valve chamber within a valve box as being adjacent the portion on the side of a stop valve opening and closing manipulation assembly and the portion on the side of a gas outlet port. Within the check valve chamber a check valve body is resiliently urged to a check valve seat for valve closing by means of a checking spring. A check valve body opening member for opening the check valve body is arranged so as to face the check valve body from the side of the check valve seat and is adapted to be advanced toward the check valve chamber so as to be changed over to the valve open position for opening the check valve body and to be retreated from the check valve chamber so as to be changed over to the valve opening cancellation position.

10 Claims, 14 Drawing Sheets

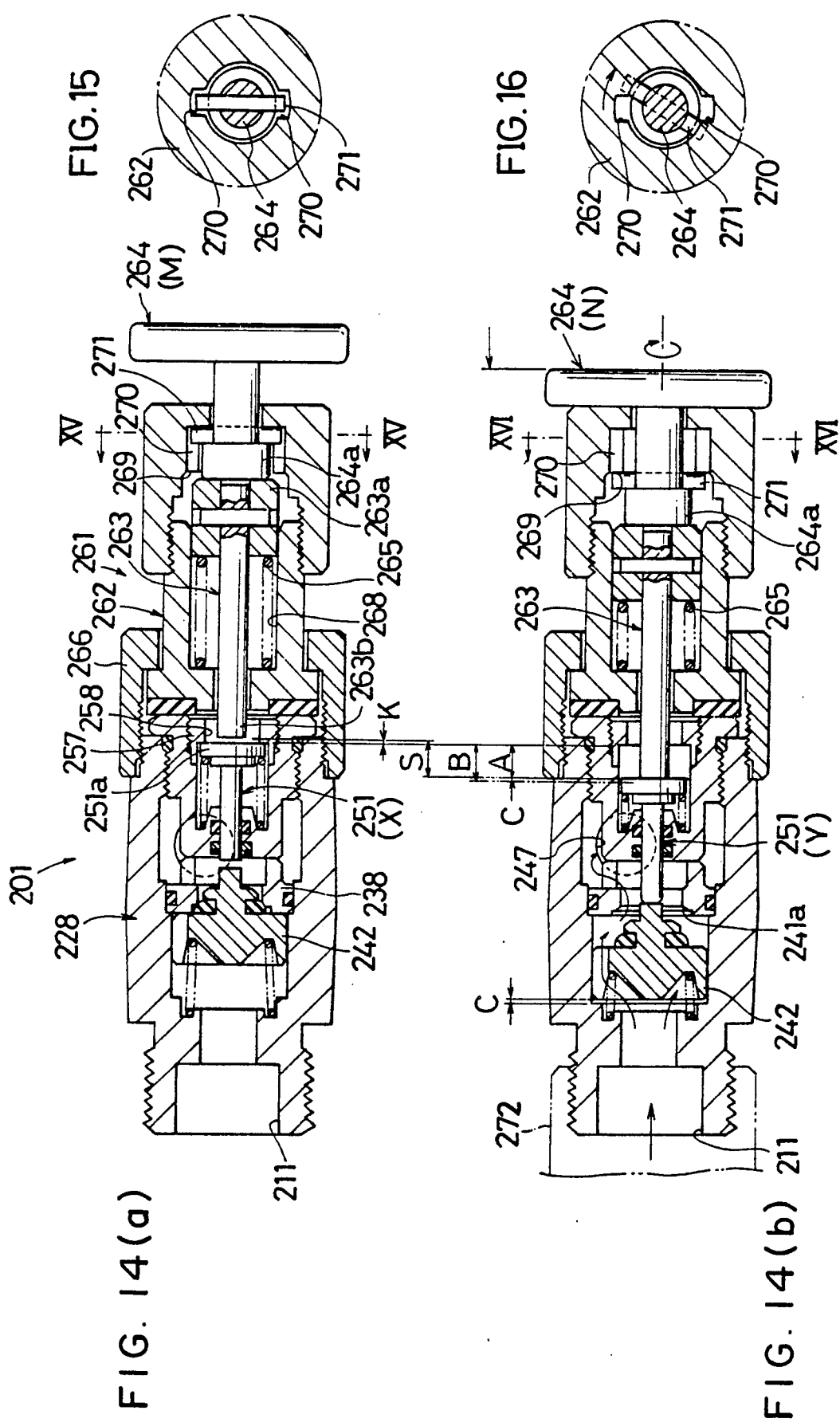

1

VALVE ASSEMBLY WITH CHECK VALVE FOR GAS CONTAINER

BACKGROUND OF THE INVENTION

1. Field of the Invention

The present invention relates to a gas container valve to be mounted to a gas container for storing a compressed gas or a liquefied gas, and, more particularly to a valve assembly with a check valve for a gas container, provided internally with a check valve so as to prevent degradation of a gas purity, which might be caused when foreign substances such as an air, a rain and the like enter the gas container.

2. Description of the Prior Art

As such a valve assembly with a check valve for a gas container, has been known the one disclosed in U.S. Pat. No. 4,341,245 (Daicho et al.).

The valve assembly disclosed in this patent specification has a gas inlet port and a gas outlet port connected in communication with each other through a gas inlet passage, a gas stop valve chamber, a check valve seat and a check valve chamber in order within a valve box, and a check valve body accommodated within the check valve chamber and resiliently urged to the check valve seat by means of a checking spring so as to be closed. The check valve body has a valve opening pressure differentiating chamber formed in a concaved configuration so as to face the gas outlet port. A check valve body opening member arranged at the leading end of a a gas charging attachment is adapted to be hermetically inserted into the valve opening pressure differentiating chamber through an O-ring, and the cross-sectional area of the hermetically sliding contact portion of the pressure differentiating chamber is larger than the inner cross-sectional area of the valve surface of the check valve body.

This valve assembly with the check valve for the gas container operates as follows.

When a gas is taken out, a gas pressure acting on the valve surface of the check valve body serves to open the check valve body against the valve-closing force of the checking spring. On the other hand, when a residual pressure within the gas container lowers to a predetermined pressure, the valve-closing force of the checking spring overcomes the gas pressure acting on the valve surface and closes the check valve body. In the case that a gas flows reversely from the gas outlet port, a pressure of the reverse-flow gas closes the check valve body interlockingly with the checking spring.

In the case that an empty gas container is recharged with a gas, when the gas charging attachment is coupled to a gas outlet nozzle, the check valve body opening member is hermetically inserted into the valve opening pressure differentiating chamber of the check valve body and the gas is charged under this condition through a gas charging passage of the gas charging attachment. Thereupon, the check valve body is opened by a differential force between the cross-sectional area of the hermetically sliding contact portion of the valve opening pressure differentiating chamber and the inside cross-sectional area of the valve surface of the check valve body on which a charge gas pressure is not acting respectively. When the gas charging attachment is removed from the outlet nozzle after the completion of the gas charging, the check valve body opening member is pulled out from the valve opening pressure differentiating chamber and the check valve body is returned to the valve opening cancellation condition.

The above-mentioned prior art has an advantage of facilitating a gas charging operation because the valve opening and the valve opening cancellation of the check valve body can be carried out simultaneously with the mounting and the demounting of the gas charging attachment relative to the outlet nozzle of the valve assembly, but still has the following drawbacks.

(1) A long time is required for a gas charging.

Since the gas charging attachment is inserted into the narrow gas outlet port having a limited dimension, the cross-sectional area of the gas charging passage in the leading end portion of the attachment can't help becoming narrow. Further, since the check body should have the cross-sectional area of the hermetically sliding contact portion of the valve opening pressure differentiating chamber made larger than the inside cross-sectional area of the valve surface, the external dimension of the check valve body opening member can't help becoming larger. Accordingly, the cross-sectional area of the flow passage provided between the inner circumferential surface of the gas outlet port and the outer circumferential surface of the valve opening member is made narrower.

In this way, since the cross-sectional area of the flow passage is narrow at the time of charging, the time required for a gas charging becomes long. In the case that a gas to be charged is a liquefied gas, this problem becomes remarkable due to a large flow resistance of the gas.

(2) An efficiency of a gas charge working is low.

It is necessary to interpose a sealing member such as an O-ring and the like between the hermetically sliding contact surface of the valve opening pressure differentiating chamber and the external circumferential surface of the check valve body opening member. In case that the sealing member is damaged by bites of foreign substances such as dirt and dust, the efficiency of the gas charge working is lowered because the charge gas enters the valve opening pressure differentiating chamber to cause a valve opening error.

SUMMARY OF THE INVENTION

It is a first object of the present invention to provide a valve assembly with a check valve for a gas container adapted to shorten a gas charging time.

It is a second object of the present invention to provide a valve assembly with a check valve for a gas container adapted to improve a working efficiency of a gas charge work.

In order to accomplish the above-mentioned objects, the present invention has advantageous features associated with the portion at which a check valve is assembled in a valve assembly for a gas container, as described in the following items (A) and (B).

(A) A check valve chamber is formed in such a portion of a circumferential wall of a stop valve chamber as being besides both the portion on the side of a stop valve opening and closing manipulation means and the portion on the side of a gas outlet port. An inlet of the check valve chamber is opened so as to face in a direction besides any directions of a gas inlet passage, a stop valve chamber, the stop valve opening and closing manipulation means and a gas outlet port. A check valve body opening member is provided for valve opening actuation of a check valve body so as to face the check valve body from the inlet side of the check valve chamber. The check valve body opening member is adapted to be changed over between the valve opening position where the check valve body is opened by the advancement thereof toward the check valve chamber and the valve opening cancellation position where it retreats to the outside of the inlet of the check valve chamber.

Incidentally, as the location where the check valve chamber is formed, the following cases can be thought out under such a view condition that the valve assembly for the gas container takes the longitudinal posture as well as the gas outlet port is located on the fore side.

When the stop valve chamber is formed in the upward open state, the check valve chamber may be formed in the lateral portion outside the stop valve chamber and in the back portion outside it. In the case of its formation in the lateral outside portion, such a formation as being coaxial or parallel with the gas outlet port, such a formation as being perpendicular to the gas outlet port and such a formation as being inclined downward may be thought out. Even though the check valve chamber is formed in the back portion outside the stop valve chamber, it may be formed at various locations similarly to the above-mentioned ones.

On the contrary, when the stop valve chamber is formed in the laterally open state, it can be thought out that the check valve chamber may be formed in any one of the upper portion outside the stop valve chamber, the back portion outside it and the lateral portion outside it, which one is not occupied by both the opening and closing manipulation means and the gas outlet port, and further may be formed in the portion on the lower side of the stop valve chamber, which portion is not occupied by the gas inlet passage.

As the valve opening actuating means of the check valve body opening member, a manually actuating type one or an automatically actuating type one employing an electric motor, a hydraulic actuator and the like can be utilized.

Further, as the stop valve opening and closing actuating means, a manually actuating type one or an automatically actuating type one employing an electric motor, a hydraulic actuator and the like can be utilized.

(B) Instead of changing over the check valve body opening member by the actuating means so as to open and close the check valve body as described in the aforementioned item (A), the check valve body is adapted to be opened and closed by the replacement of a check valve body opening rod and a plug.

That is, a valve opening rod insertion hole is opened in an end wall facing the check valve chamber from the side of a check valve chamber inlet so as to face the check valve chamber inlet. The check valve body opening rod and the plug are adapted to be replaceably inserted into the valve opening rod insertion hole. When the check valve body opening rod is inserted into the valve opening rod insertion hole, a valve opened condition in which the check valve body is opened by means of the check valve body opening rod is presented. On the other hand, when the plug is inserted into the valve opening rod insertion hole, a valve opening cancellation condition in which the valve opening of the check valve body is cancelled and the valve opening rod insertion hole is closed by means of the plug is presented.

The present invention is applied as follows.

In the invention according to the item (A):

In the case that the empty gas container is recharged with a gas, the check valve body is adapted to be opened by the advancement of the check valve body opening member to the valve-opening position and the gas outlet nozzle is adapted to be coupled with the gas charging attachment so that the recharge gas can be supplied under pressure to the valve assembly for the gas container by opening the stop valve body by means of the stop valve opening and closing manipulation means. Thereupon, the gas is recharged into the gas container from the gas outlet port through the check valve chamber, the stop valve chamber and the gas inlet port in order.

After the completion of gas charging, the stop valve body is closed, the gas charging attachment is removed from the gas outlet nozzle, and the check valve body opening member is retreated to the valve opening cancellation position by the operation of the valve opening actuating means for the valve opening cancellation so that the check valve body can take the checking condition.

In the invention according to the item (B):

When a gas is taken out of the gas container, the plug is inserted into the valve opening rod insertion hole so that the valve opening of the check valve body can be cancelled.

To the contrary, when a gas is charged into the gas container, instead of the plug the check valve body opening rod is inserted into the valve opening insertion hole so that the check valve body can be opened. Under this valve-opening condition, the gas is charged. When the gas charging is completed, instead of the check valve body opening rod the plug is inserted again so that the check valve can be returned to the valve opening cancellation condition.

Thereupon, for example in the case that the external configurations of a cap nut for supporting the plug and of a cap nut for supporting the check valve body opening rod are different from each other, it can be judged readily only by observing their external configurations whether the check valve body is in the valve opening condition or in the valve valve opening cancellation condition. Therefore, the working efficiency of the gas charge work is improved.

According to the inventions of the items (A), (B), the following advantages are provided.

(1) A time required for a gas charging can be shortened.

The valve opening operation of the check valve body at the time of a gas charging is carried out only by changing over the check valve body opening member by means of the valve opening actuating means from the outside of the valve box or only by replacing the plug inserted into the valve opening rod insertion hole with the check valve body opening rod.

In this way, since it is unnecessary to insert the leading end portion of the gas charging attachment into the gas outlet port and further to insert the check valve body opening member into the gas outlet port, the cross-sectional area of the flow passage of the gas outlet port is not narrowed. Resultantly, a flow resistance of the charge gas can become smaller at the time of a gas charging and the time required for the gas charge can be shortened.

(2) The working efficiency of the gas charge is improved.

Since the check valve body is forcedly opened by means of a pushing force of the check valve body opening member at the time of the gas charge working, it is possible to prevent a valve opening error which might be caused by a damage of the sealing member such as an O-ring and the like and to improve the working efficiency.

Incidentally, according to the invention of the item (A), further the following advantage can be provided.

(3) A contamination within the gas container at the time of the gas charge can be prevented.

Since the check valve body opening member is always kept to be mounted within the valve box, it is possible to prevent foreign substances such as dirt and dust from being attached to the check valve body opening member. Therefore, it is possible to restrain foreign substances outside the gas container from being brought into the gas container together with the flow of charge gas and to prevent the contamination within the gas container at the time of the gas charging.

BRIEF DESCRIPTION OF THE DRAWINGS

The above and other objects, advantages and features of the invention will become apparent when considered with the following description and annexed drawings wherein:

FIGS. 1 through 32 show embodiments of the present invention;

FIGS. 1 through 7 show a first embodiment;

FIG. 1 is a vertical sectional view of a valve assembly with a check valve for a gas container;

FIG. 2 is a sectional view along the II—II directed line in FIG. 1;

FIG. 3 is a reduced view along the III—III directed line in FIG. 2;

FIG. 4 is a sectional view along the IV—IV directed line in FIG. 1;

FIG. 5 is a view showing a gas takeout condition;

FIG. 6 is a plan view showing a gas charging condition;

FIG. 7 is an enlarged sectional view along the VII—VII directed line in FIG. 6;

FIGS. 8 through 10 show a plurality of variants of the aforementioned first embodiment;

FIG. 8 and FIG. 9 show a first variant;

FIG. 8 is a partial view corresponding to FIG. 2;

FIG. 9 is a view corresponding to FIG. 3;

FIG. 10 shows a second variant and is a partial view corresponding to FIG. 7;

FIGS. 11 through 16 show a second embodiment;

FIG. 11 is a view corresponding to FIG. 1;

FIG. 12 is a view corresponding to FIG. 2;

FIG. 13 is a view corresponding to FIG. 5;

FIG. 14 is a view showing such a condition as an actuating means of a check valve body opening member is attached to a valve assembly with a check valve for a gas container;

FIG. 15 is a sectional view along the XV—XV directed line in FIG. 14(a);

FIG. 16 is a sectional view along the XVI—XVI directed line in FIG. 14(b);

FIGS. 17 through 29 show various variants of the aforementioned second embodiment;

FIG. 17 shows a first variant and is a view corresponding to FIG. 14;

FIG. 18 shows a second variant and is a view corresponding to FIG. 14;

FIGS. 19 through 21 show a third variant;

FIG. 19 is a view corresponding to FIG. 14;

FIG. 20 is a sectional view along the XX—XX directed line in FIG. 19(a);

FIG. 21 is an explanatory view of an operation;

FIG. 22 and FIG. 23 show a fourth variant;

FIG. 22 is a view corresponding to FIG. 14;

FIG. 23 is a sectional view along the XXIII—XXIII directed line in FIG. 22;

FIG. 24 and FIG. 25 show a fifth variant;

FIG. 24 is a view corresponding to FIG. 14;

FIG. 25 is a sectional view along the XXV—XXV directed line in FIG. 24;

FIG. 26 and FIG. 27 show a sixth variant;

FIG. 26 is a view corresponding to FIG. 22;

FIG. 27 is a sectional view along the XXVII—XXVII directed line in FIG. 26;

FIG. 28 shows a seventh variant and is a view corresponding to FIG. 12;

FIG. 29 shows an eighth variant and is a view corresponding to FIG. 14(b);

FIG. 30 shows a third embodiment;

FIG. 31 and FIG. 32 show a fourth embodiment;

FIG. 31 is a view corresponding to FIG. 1; and

FIG. 32 is a right side view of FIG. 31.

DESCRIPTION OF THE PREFERRED EMBODIMENTS

Now, the embodiments of the present invention will be explained with reference to the annexed drawings hereinafter.

<First Embodiment>

FIGS. 1 through 7 show a first embodiment of the present invention.

Figure 1:
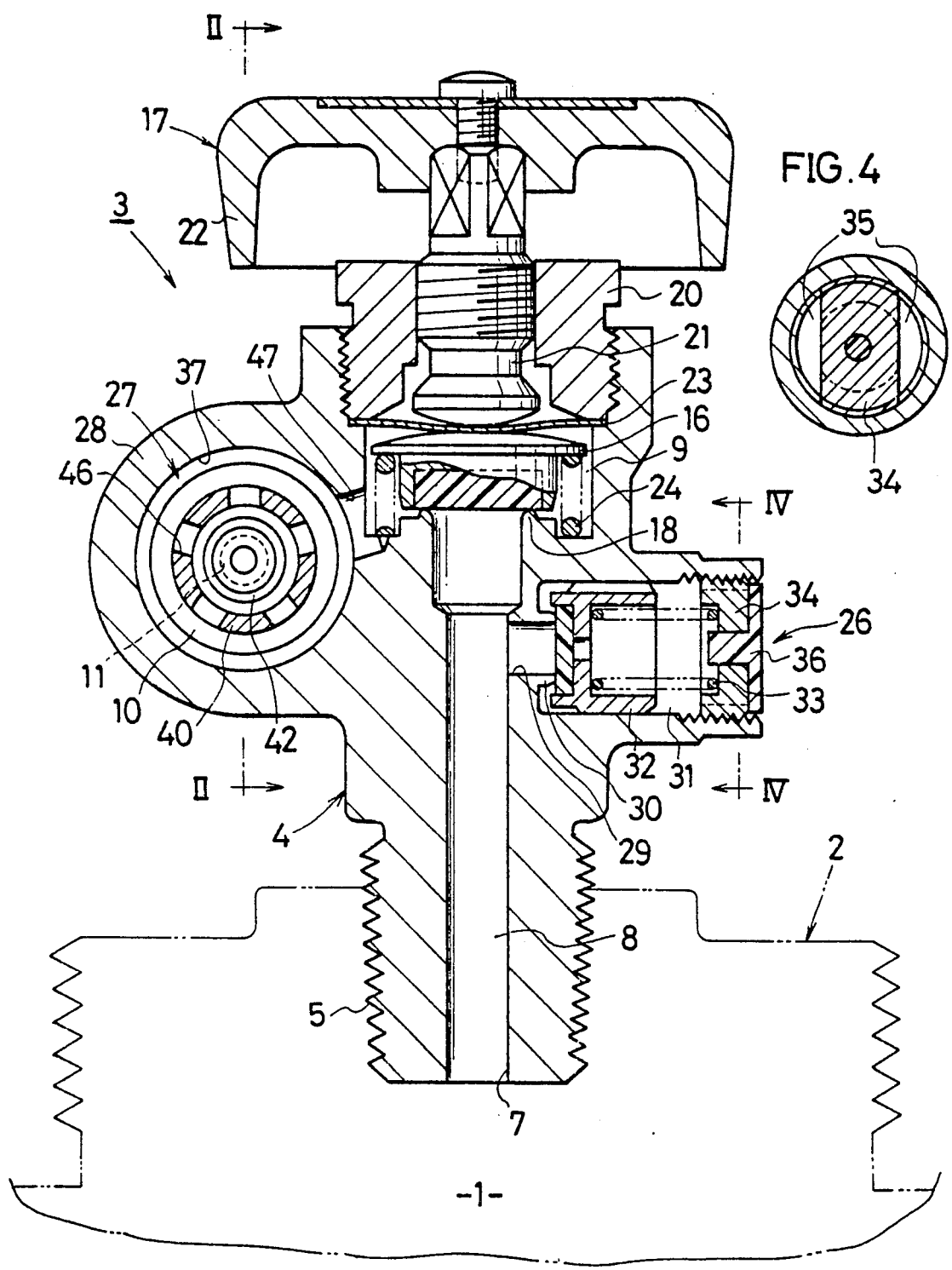
Figure 2:
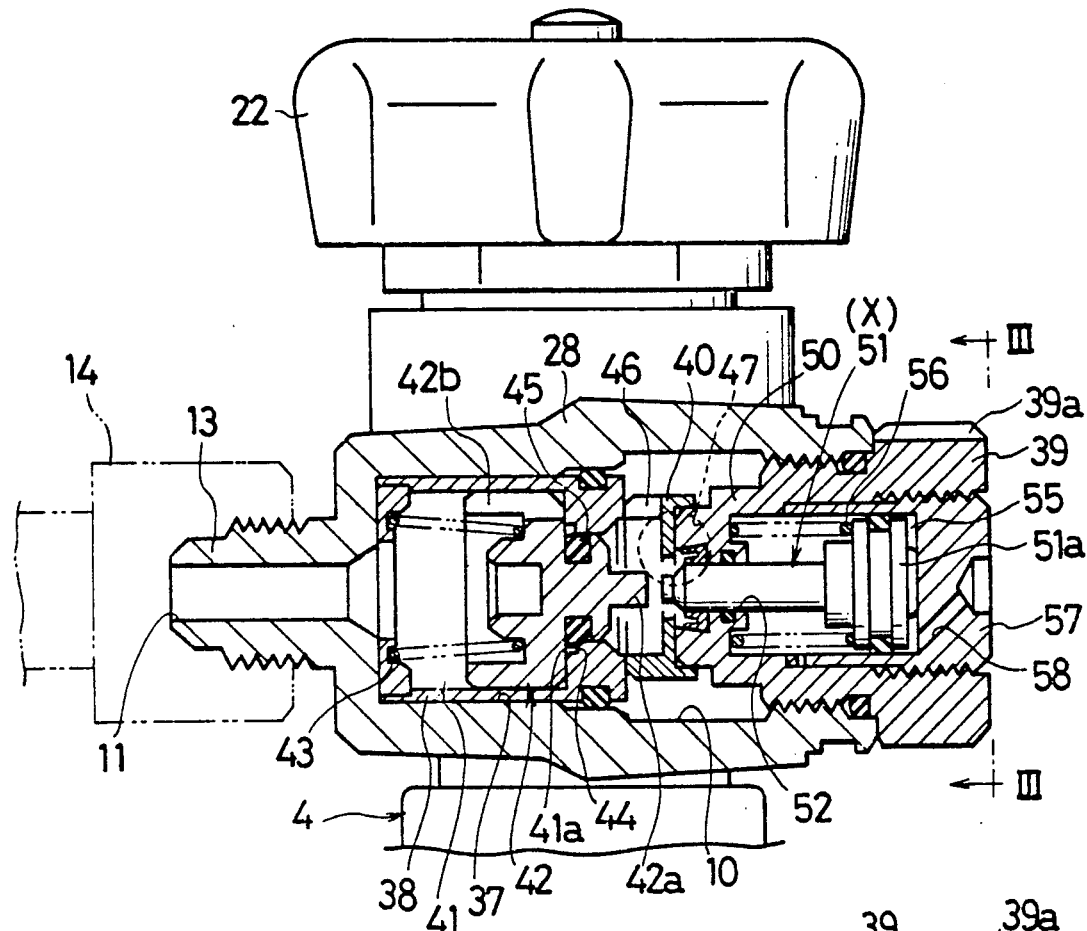
Figure 3:
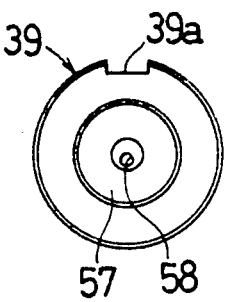

In FIG. 1 and FIG. 2, a valve box 4 of a valve assembly 3 is threadably secured to a neck portion 2 of a gas container 1. The valve box 4 is formed in a longitudinally long shape and has a gas inlet port 7 formed in the bottom surface of its threaded foot portion 5. The gas inlet port 7 is connected in communication with a gas outlet port 11 through a longitudinal gas inlet passage 8, a stop valve chamber 9 and a gas outlet passage 10 in order. The gas inlet passage 8 and the stop valve chamber 9 are arranged coaxially. The gas outlet port 11 is opened forward (toward the left side in FIG. 2) at a midway height portion of the valve box 4, and a gas takeout attachment 14 is adapted to be coupled to an outlet nozzle 13 provided at the circumferential wall of the gas outlet port 11.

The aforementioned stop valve chamber 9 is formed in the upper portion of the valve box 4 in the upward open state. A stop valve body 16 inserted into the stop valve chamber 9 from above is adapted to be manipulated for valve-opening and valve-closing relative to a stop valve seat 18 by means of a stop valve opening and closing manipulation means 17 of a manually operated type. That is, by downward advancing a valve rod 21 threadably engaged with a valve cover 20 so as to be advanced and retreated in the vertical direction by means of a handle wheel 22, the stop valve body 16 is brought into sealing contact with the stop valve seat 18 through a metal diaphragm 23. To the contrary, by upward retreating the valve rod 21 by means of the handle wheel 22, the stop valve body 16 is separated from the stop valve seat 18 by means of a resilient force of a valve-opening spring 24.

In the lower portion of the valve box 4 there is provided a safety valve 26, and in the upper laterally swelled portion 28 of the valve box 4 there is provided a check valve 27. By suitably selecting a mounting location of the check valve 27 in that way, the valve assembly 3 is made totally compact so as to be readily accommodated within a protection cap (not illustrated) threadably secured to the neck portion 2 of the gas container 1. Therefore, a conventional gas container and a conventional protection cap can be utilized as they are.

The safety valve 26 is constructed as follows.

A gas introduction passage 29, a safety valve seat 30 and a safety valve chamber 31 are arranged in order from a midway height portion of the gas inlet passage 8. A safety valve body 32 inserted into the safety valve chamber 31 is adapted to be brought into sealing contact with the safety valve seat 30 by means of a safety securing pressure setting spring 33. A gas blowoff hole 35 is formed in a resilient force adjusting screw 34 for the spring 33. By the way, the safety valve 26 may be of another type such as a bursting plate type and the like instead of a spring type.

The check valve 27 is constructed as follows.

A check valve mounting hole 37 extending in the fore and rear direction (in the left and right direction in FIG. 2) is formed in the lateral portion outside the stop valve chamber 9, namely in the lateral swelled portion 28 in the rearward (rightward in the same figure) open state. A cylindrical cassette 38 is detachably and hermetically inserted into the check valve mounting hole 37 and fixedly pressed down by means of a cassette pressing-down member 39 through a push ring 40. The cassette pressing-down member 39 is adapted to be advanced and retreated relative to the lateral swelled portion 28 when being turned through a screw driving groove 39a.

The check valve body 42 is inserted into the check valve chamber 41 formed in the cylindrical cassette 38. This check valve body 42 is resiliently urged toward a check valve seat 44 of the cylindrical cassette 38 by means of a checking spring 43 within the check valve chamber 41. At least one flow passage groove 42b is formed in the surrounding wall of the check valve body 42 in the fore and rear direction and a valve sealing packing 45 is fitted in the back portion of the check valve body 42. The stop valve chamber 9 and the check valve chamber 41 are connected in communication with each other through an intermediate communication hole 47, an external surrounding space around the push ring 40, a plurality of cutout grooves 46 of the push ring 40 and an internal space of the push ring 40 in order. Since the check valve 27 can be mounted and demounted due to its cassette type construction by only attaching and detaching the cylindrical cassette 38 relative to the lateral swelled portion 28, it becomes possible to facilitate the maintenance.

In the lateral swelled portion 28 there is additionally provided a check valve body opening member 51 which serves to forcedly separate the check valve body 42 from the check valve seat 44.

That is, a valve opening member insertion hole 52 for the check valve body opening member 51 is formed in the foreside end wall 50 of the cassette pressing-down member 39 substantially coaxially with the check valve body 42 as a through hole facing the valve opening actuated portion 42a of the check valve body 42. The check valve body opening member 51 is hermetically inserted into this insertion hole 52 through a U-packing and an O-ring so as to be advanced and retreated in the fore and rear direction. The check valve body opening member 51 has an input portion 51a formed as a hydraulic actuating piston and is adapted to be driven forward against a resilient force of a valve opening cancellation spring 56 by an introduction of a pressure air and the like into a valve opening actuation chamber 55 provided behind the input portion 51a. The valve opening member 51 is received by a rear end wall 57 of the valve opening member insertion hole 52 so as to be prevented from being moved rearward farther than a predetermined distance by a resilient force of the spring 56. A check valve body opening actuating input port 58 composed of a flow passage for a pressurized fluid is formed in the rear end wall 57.

This input port 58 is formed in an inclined state with respect to the axis of the input portion 51a of the check valve body opening member 51. Therefore, even though the rear end wall 57 is pushed forward by a collision with a foreign member or by a mistaken manipulation of a push rod and the like on the rear side of the rear end wall 57, the input portion 51a can be prevented from being pushed forward. Accordingly, the check valve body 42 can be prevented from being opened by mistake.

The above-mentioned valve assembly 3 with the check valve for the gas container operates as follows.

Figure 5:
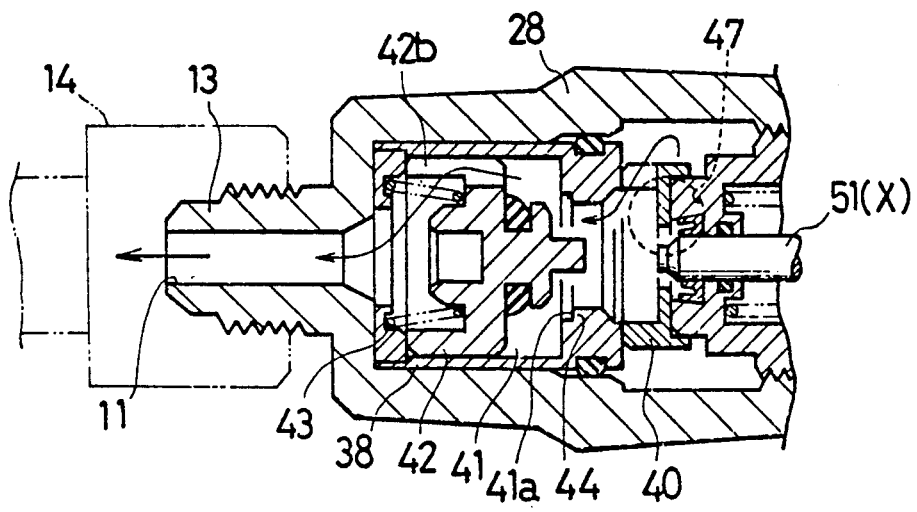

When a gas is taken out, the stop valve body 16 is manipulated for valve opening by means of the stop valve opening and closing manipulation means 17. When the residual pressure within the gas container 1 is larger than a predetermined pressure under this valve open condition, as shown in FIG. 5, the check valve body 42 is separated from the check valve seat 44 against the valve closing force of the checking spring 43 by means of the pressure of the gas flown into the inside hole of the push ring 40 from through intermediate communication hole 47. Thereby, the gas within the gas container 1 is flown out of the check valve chamber inlet 41a to the gas outlet port 11 through the flow passage groove 42b of the check valve body 42. On the contrary, when the residual pressure within the gas container 1 lowers to the predetermined pressure as the gas is taken out, the check valve body 42 is brought into sealing contact with the check valve seat 44 by means of the valve closing force of the checking spring 43. Thereby, the residual pressure within the gas container 1 is held at the predetermined pressure. When the revers-flow gas flows from the gas outlet port 11 into the check valve chamber 41, the pressure of the reverse-flow gas acts on the check valve body 42 as a valve closing force in addition to the valve closing force of the checking spring 43 so as to bring the check valve body 42 into sealing contact with the check valve seat 44. Thereby, the reverse flow gas is prevented from flowing reversely from the check valve seat 44 to the gas inlet port 7 through the stop valve chamber 9.

Figure 6:
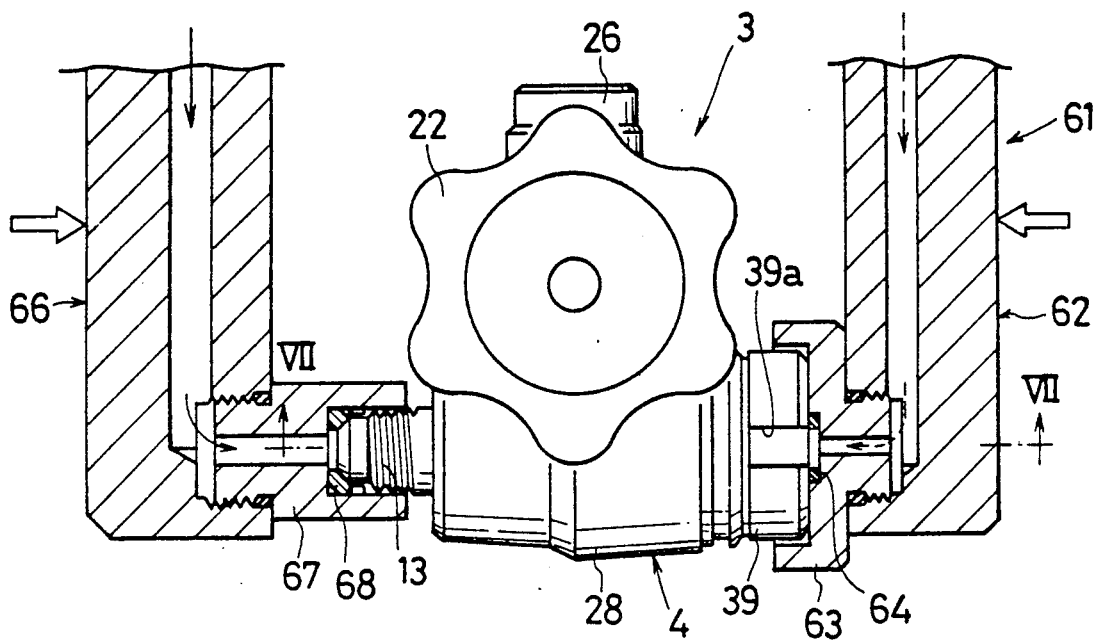
Figure 7:
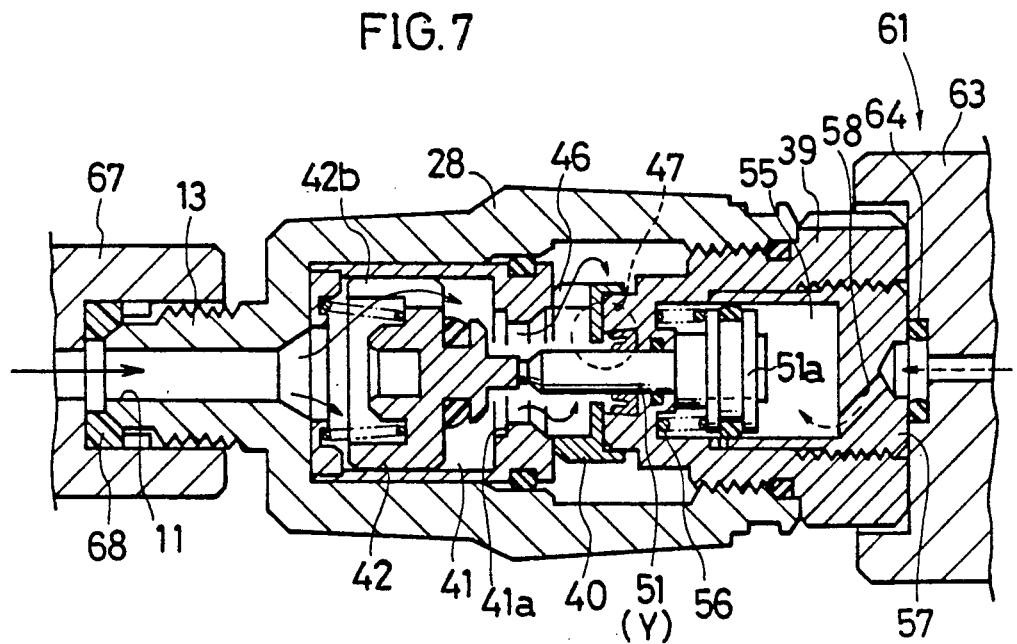

As shown in a plan view of FIG. 6 and a vertical sectional view of FIG. 7, when a vacuum evacuation or a gas charging of the empty gas container 1 is carried out, a mouthpiece 63 of a pressurized fluid supply and discharge attachment 62 for the check valve body opening hydraulic actuating means 61 is externally engaged with the cassette pressing-down member 39 of the valve assembly 3 so as to be brought into sealing contact with the outside end surface of the rear end wall 57 through an O-ring 64 and a mouthpiece 67 of a gas charging attachment 66 is externally engaged with the outlet nozzle 13 of the valve assembly 3 so as to be brought into sealing contact with the nozzle 13 through a gasket 68. Under this condition, the gas charging attachment 66 and the pressurized fluid supply and discharge attachment 62 are pushed toward each other from right and left opposite sides by means of a pushing means ( not illustrated ) as indicated by the directed lines in FIG. 6.

When the gas is charged, the stop valve body 16 is manipulated for valve opening by means of the stop valve opening and closing manipulation means 17 as described above and then a compressed air as the pressurized fluid is supplied to the valve opening actuating chamber 55 from the pressurized fluid supply and discharge attachment 62 through the input port 58. Thereupon, the check valve body opening member 51 is pushed toward the left side by a pressure of the compressed air so as to be changed over to the valve open position Y and to open the check valve body 42. Thereupon, the charge gas supplied from the gas charging attachment 66 flows from the gas outlet port 11 into the intermediate communication hole 47 through the check valve chamber 41, the inlet 41a thereof and the push ring 40 and further flows therefrom through the stop valve chamber 9, the gas inlet passage 8 and the gas inlet port 7 so as to be charged into the gas container 1.

After the completion of the gas charging, the compressed air is discharged from the valve opening actuating chamber 55. Thereupon, the check valve body opening member 51 is pushed toward the right side so as to be changed over to the valve opening cancellation position X ( refer to FIG. 2 ) and to effect the checking function of the check valve body 42.

The valve assembly with the check valve for the gas container, having the above-mentioned construction provides the following advantages besides the advantages (1), (2), (3) described in the summary of the invention.

That is, since the aforementioned conventional embodiment requires the check valve body opening member to be inserted into the gas outlet port, the outlet nozzle can't help becoming larger in size. Accordingly, only a large diameter thread is applied to a connecting threaded portion formed in the external periphery of the outlet nozzle. To the contrary, according to the present invention, since the check valve body opening member 51 can be actuated from the opposed side to the gas outlet port 11 so that it is unnecessary to insert the leading end portions of the valve opening member 51 and the gas charging attachment 66 into the gas outlet port 11, the outer diameter of the outlet nozzle 13 can be made smaller and also a small diameter thread can be applied to the connecting threaded portion.

Incidentally, instead of the compressed air an inert gas such as a nitrogen gas and a hydraulic pressure may be utilized as the pressurized fluid supplied to the pressurized fluid supply and discharge attachment 62. Further, by separating the charge gas to be charged from now on so as to supply it to the pressurized fluid supply and discharge attachment 62, it is possible to utilize the pressure of the charge gas itself.

The aforementioned check valve chamber 41 may be disposed in such a portion of the circumferential wall of the stop valve chamber 9 as being besides the portion on the side of the stop valve opening and closing manipulation means 17 and the portion on the side of the gas outlet port 11. In the case that the opening and closing manipulation means 17 is arranged horizontally, the check valve chamber 41 may be disposed above the stop valve chamber 9.

Figure 8:
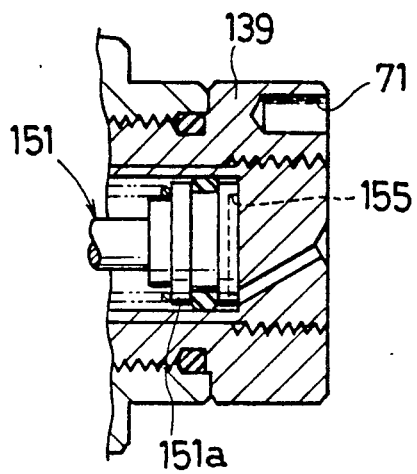
Figure 9:
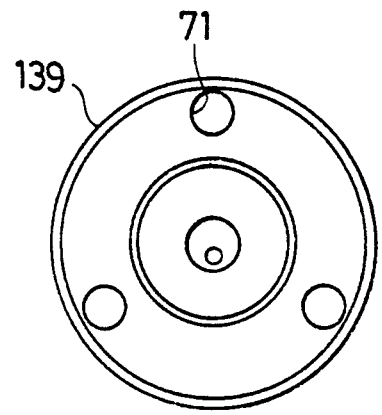

FIGS. 8 and 9 show a first variant of the aforementioned first embodiment. The valve actuating chamber 155 is formed in the rear portion of the piston type input portion 151a of the check valve body opening member 151. Three screw driving pin holes 71 are formed in the outer end surface of the cassette pressing-down member 139.

Figure 10:
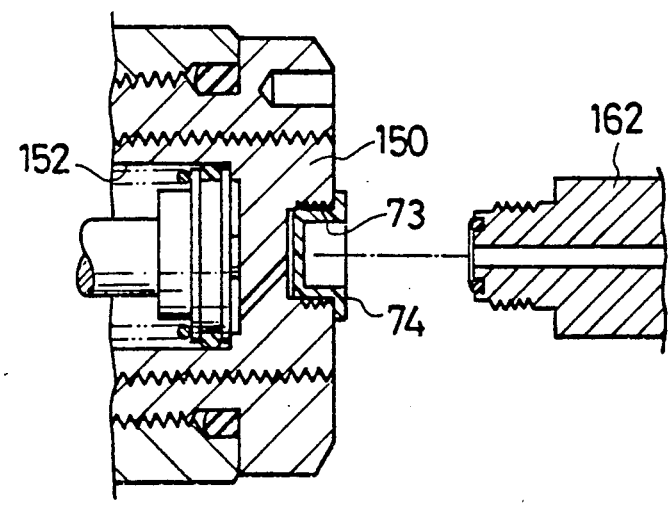

FIG. 10 shows a second variant of the first embodiment. A coupling threaded hole 73 for the pressurized fluid supply and discharge attachment 162 is formed in the rear end wall 150 of the valve opening member insertion hole 152, and a dust-proof cap 74 is fitted in this hole 73. A plug instead of the cap 74 may be fitted in the threaded hole 73.

FIGS. 11 through 32 show second through fourth embodiments, and constructions different from the first embodiment will be explained hereinafter.

<Second Embodiment>

FIGS. 11 through 16 show the second embodiment.

Figure 11:
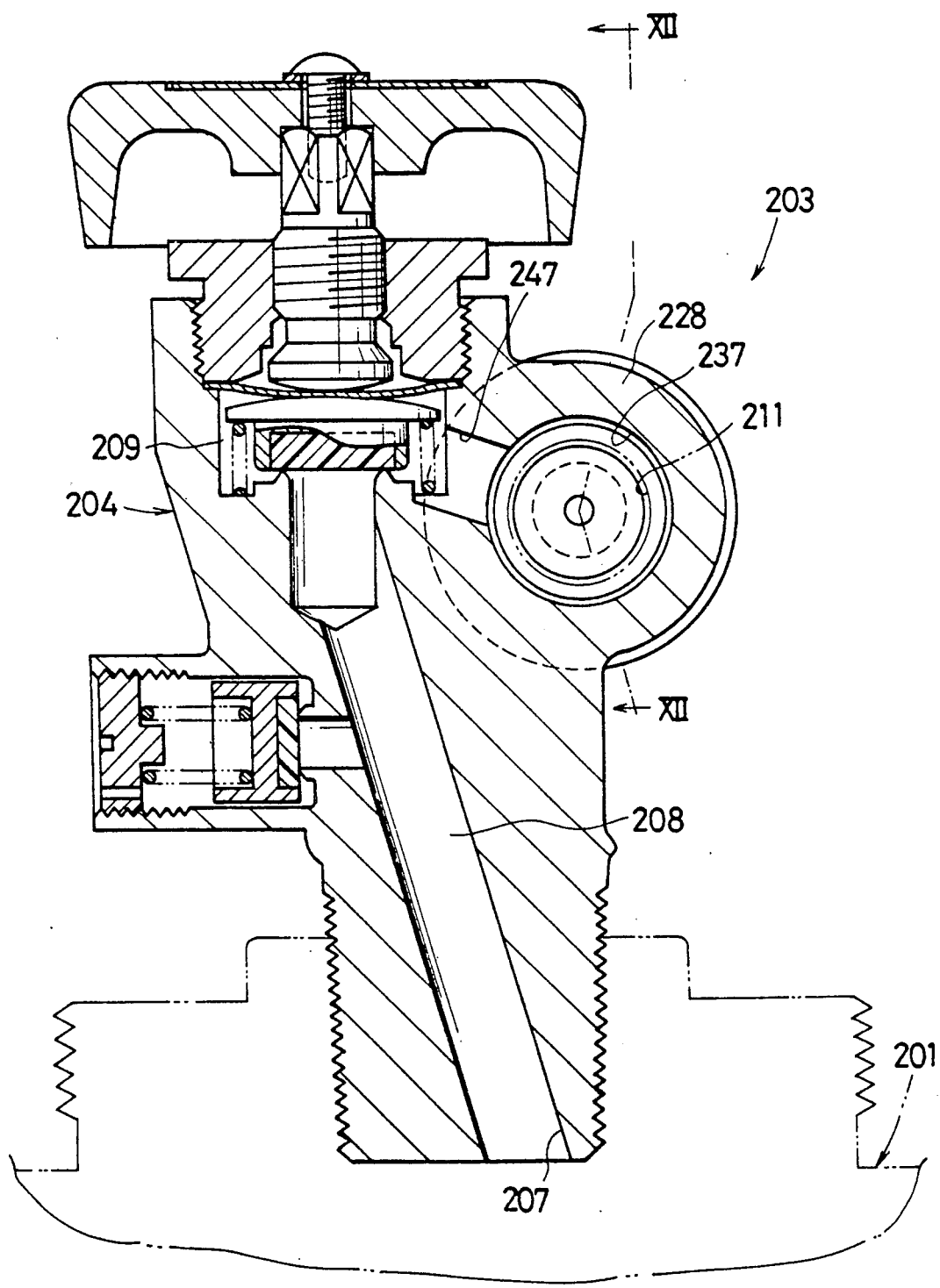

As shown in FIG. 11, the valve assembly 203 has the gas inlet passage 208 inclined within the valve box 204 so that the center of the gas inlet port 207 and the axis of the stop valve chamber 209 are eccentric to each other.

Figure 12:
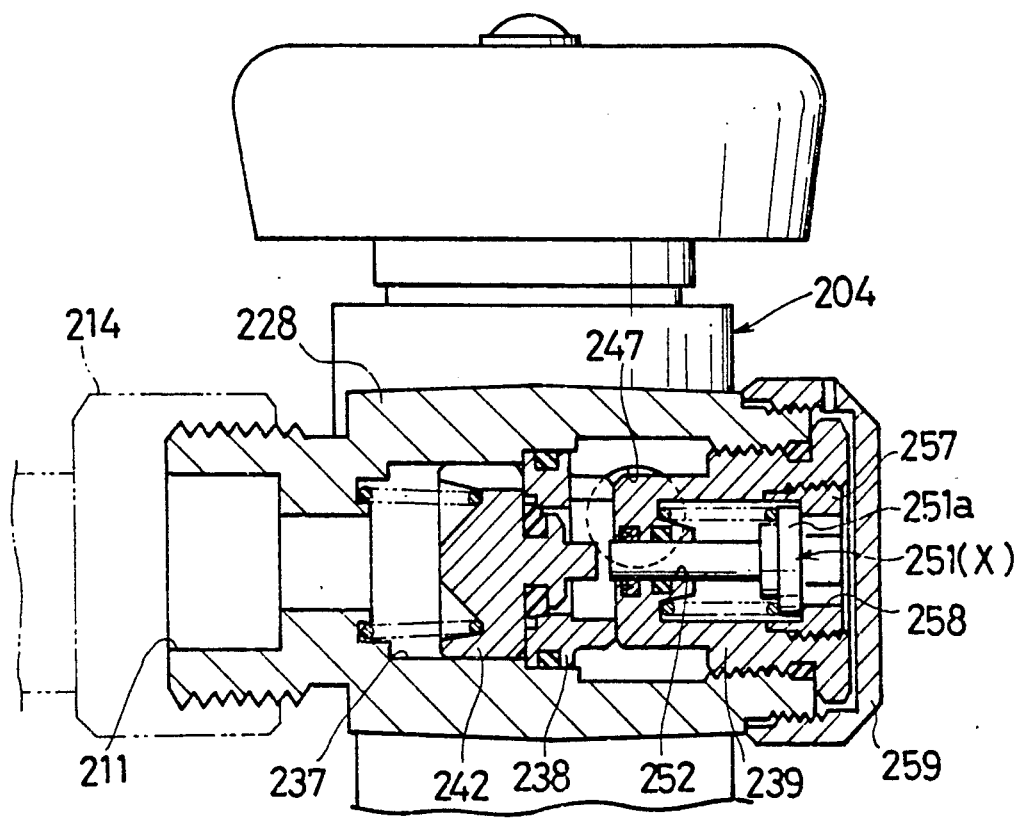

As shown in FIG. 12, the check valve body 242 is inserted directly without the cassette into the check valve body mounting hole 237 formed in the lateral swelled portion 228. The check valve body 242 is received by means of a cylinder pressing-down member 239 through a valve seat cylinder 238. The check valve body opening member 251 is adapted to be manually changed over from the valve opening cancellation position X on the right side to the valve open position Y on the left side (refer to FIG. 14(b) ). The check valve body opening actuating input hole 258 is formed as a through hole in the central portion of the rear end wall 257 of the valve opening member insertion hole 252. This insertion hole 258 is covered by a covering cap nut 259.

The threaded portion of the cap nut 259 engaged with the lateral swelled portion 228 may be preferably sealed by means of a thermo-contractible tube and the like. That is, when an empty gas container 201 is collected, it can be readily judged by the inspection about a breakage of the seal whether the cap nut 259 was removed or not so as to actuate the check valve body opening member 251 for valve opening. Therefore, a contaminated gas container can be readily excluded and an efficiency of the gas charging work can be improved.

Figure 13:
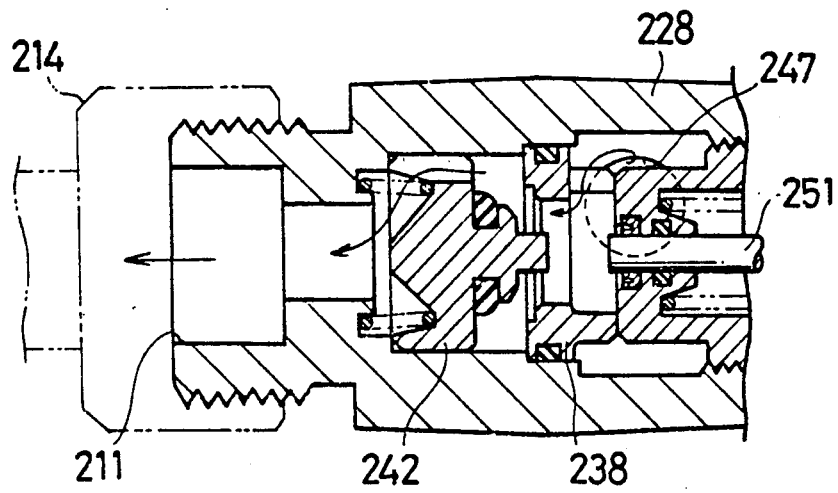

When the gas is taken out as shown in FIG. 13, the gas in the gas container 201 flows into the valve seat cylinder 238 through the gas inlet port 207, the stop valve chamber 209 and the intermediate communication hole 247 to open the check valve body 242 by the gas pressure and then flows out of the gas outlet port 211 to the gas takeout attachment 214.

When a gas charging for the empty gas container 1 is carried out, as shown in FIG. 14, instead of the covering cap nut 259 the actuating means 261 of the check valve body opening member 251 is mounted to the valve box 4. This actuating means 261 is constructed as shown in FIGS. 14 through 16. FIG. 14(a) shows the valve opening cancellation condition, and FIG. 14(b) shows the valve open condition.

That is, the actuating means 261 is provided with a support cylinder 262, a valve opening push rod 263, a pushing actuation member 264, a rod retreating spring 265 and a mounting member 266. The push rod 263 is inserted into a cylindrical hole 268 of the support cylinder 262 so as to be advanced and retreated in the fore and rear direction. Under the condition that the support cylinder 262 is fixedly secured at its front surface to the valve box 204 of the valve assembly 201 by means of a mounting member 266, the cylindrical hole 268 of the support cylinder 262 is arranged linearly to the check valve body opening input port 258, and the output portion 263b of the push rod 263 is opposed to the input portion 251a of the check valve body opening member 251 through a contact gap K. An advancement receiving surface 269 and guide grooves 270 are formed in the rear portion of the cylindrical hole 268 of the support cylinder 262 fore and rear respectively, and guide pins 271 of the pushing actuation member 264 are fitted in the guide grooves 270.

The pushing actuation member 264 is adapted to be changed over to a valve opening cancellating actuating position M where the guide pins 271 are located at the rear portion of the guide grooves 270 as shown in FIG. 14(a) and to a valve opening actuating position N where the guide pins 271 are received by the advancement receiving surface 269 from behind as shown in FIG. 14(b). The push rod 263 is resiliently urged backward by means of the rod retreating spring 265, and the input portion 263a of the push rod 263 is connected to the output portion 264a of the pushing actuation member 264.

Under the condition that the pushing actuation member 264 is changed over to the valve opening cancellating actuating position M, the push rod 263 is retreated by means of the rod retreating spring 265, and to the contrary under the condition that the pushing actuation member 264 is changed over to the valve opening actuating position N, the push rod 263 is advanced by the output portion 264a of the pushing actuation member 264 against the rod retreating spring 265.

The aforementioned push rod 263 is formed in such a dimension that a valve opening pushing distance A thereof obtained by subtracting the contact gap K from an advancing and retreating stroke S thereof becomes smaller than a check valve body full opening advancement distance B of the check valve body opening member 251. As shown in FIG. 14(b), when the push rod 263 changes over the check valve body opening member 251 to the valve open position Y to open the check valve body 242 by changing over the pushing actuation member 264 to the valve opening actuating position N, the valve opening margin clearance C is provided in front of the check valve body 242.

FIGS. 17 through 29 show various variants of the aforementioned second embodiment.

Figure 17:
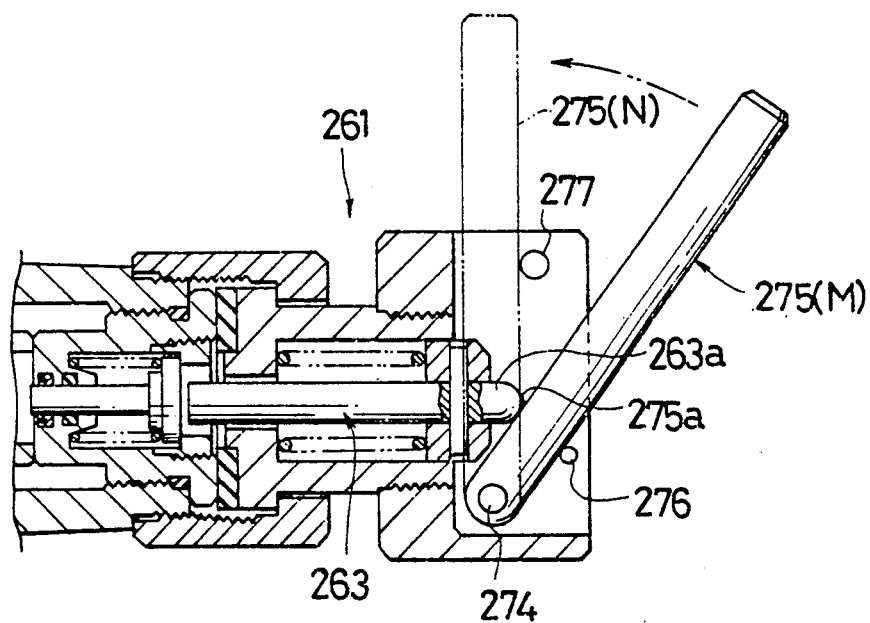

FIG. 17 shows a first variant thereof. The actuating means 261 is provided with a swingable lever 275 which is pivotally supported at its lower end by means of a pin 274, and the output portion 275a formed in the lower portion thereof is kept in contact with the input portion 263a of the push rod 263. The swingable lever 275 is adapted to be held by means of a support pin 276 at the valve opening cancellating actuating position M and to be held by means of a lock pin 277 at the valve opening actuating position N.

Figure 18:
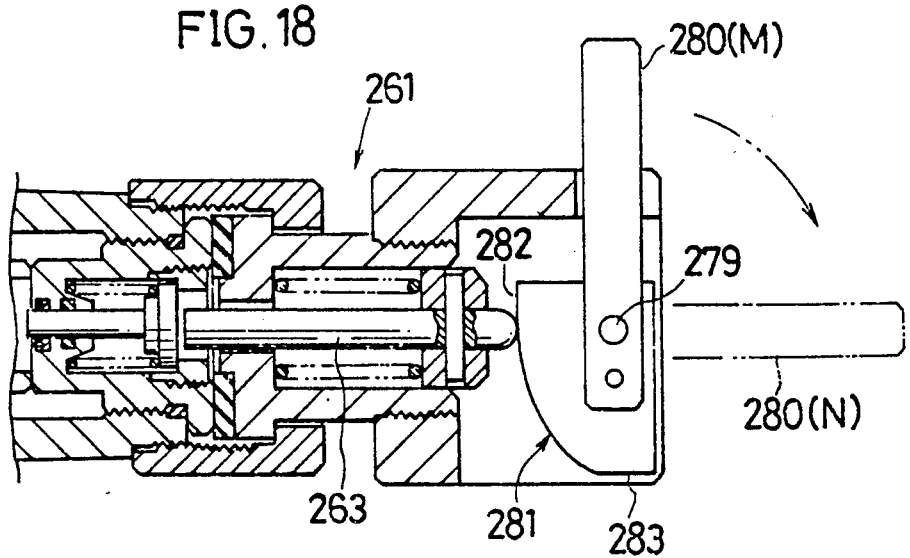

FIG. 18 shows a second variant thereof. The actuating means 261 is composed of a cam-shaped output portion 281 fixedly secured to a swingable end portion of an actuation lever 280 pivotally supported by a pin 279. When the actuation lever 280 is actuated to the valve opening cancellating actuating position M so as to face upward, the push rod 263 is adapted to be retreated by means of a retreat cam surface 282. When the actuation lever 280 is actuated to the horizontal valve opening actuating position N, the push rod 263 is adapted to be advanced by means of an advancement cam surface 283.

Figure 19A:
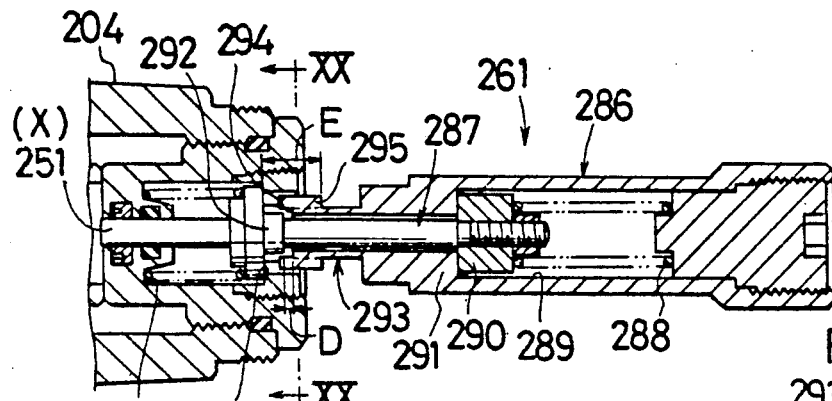
Figure 20:
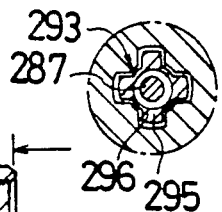
Figure 19B:
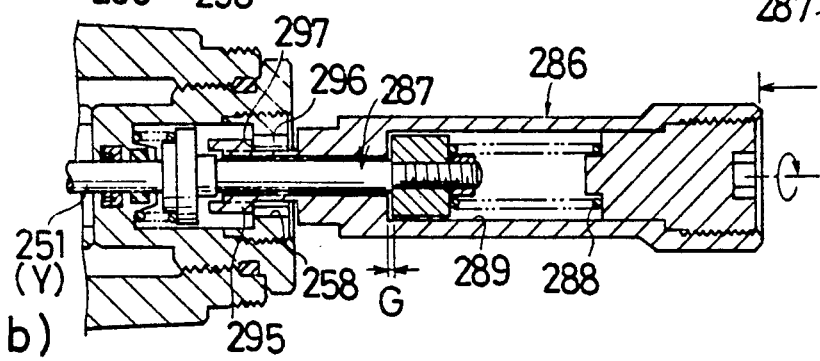
Figure 21:
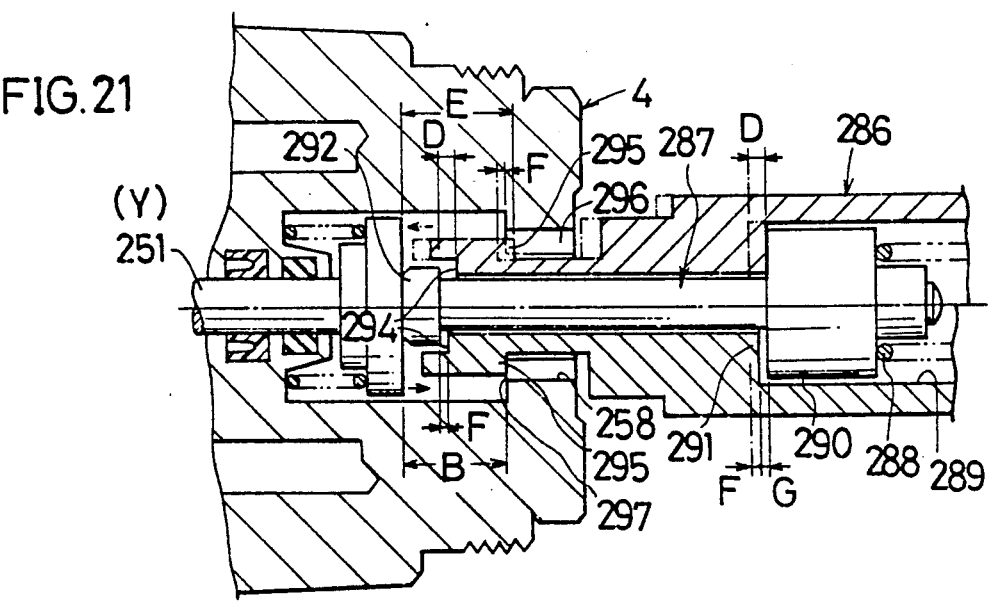

FIGS. 19 through 21 show a third variant thereof employing further another variant of the actuating means 261. FIG. 19(a) shows the starting condition of the valve opening actuation, and FIG. 19(b) shows the completed condition of the valve opening actuation.

The aforementioned actuating means 261 is used as follows.

Firstly as shown in FIG. 19(a), the pushing output portion 292 of the push rod 287 at the fore end (at the left end) thereof and the valve opening insertion portion 293 are inserted into the check valve body opening actuating input port 25 so as to advance a rotatable actuating cylinder 286 forward. Thereupon, as indicated by the solid line in the upper half view of FIG. 21, the check valve body opening member 251 is advanced to the valve open position Y by a resilient force of a rod extension spring 288 through the push rod 287. The check valve body opening member 251 is advanced by the check valve body full opening advancement distance B so as to full open the check valve body and is received by the fore end wall of the check valve chamber (herein, not illustrated).

Subsequently, as indicated by the alternate long and short dash line in the upper half view of FIG. 21, the rotatable actuating cylinder 286 is contracted by the push rod contractible gap D with respect to the push rod 287. Thereupon, a push rod contact portion 294 is brought into contact with the pushing output portion 292 so as to provide a locking margin clearance F between the rear surface of an insertion locking portion 295 and a receiving surface 297 of the check valve body opening actuating input port 258. Under this condition, the rotatable actuating cylinder 286 is manually turned about the push rod 287 and then a hand is released from the rotatable actuating cylinder 286.

Thereupon, as shown in the lower half view of FIG. 21, the rotatable actuating cylinder 286 is extended by the locking margin clearance F with respect to the push rod 287 by means of the rod extension spring 288 so that the rear surface of the insertion locking portion 295 is received by the receiving surface 297 of the check valve body opening actuating input port 258. Under this condition, there is provided an extension margin clearance G between the extension stopper portion 290 of the push rod 287 and the extension receiving portion 291 of the rotatable actuating cylinder 286. Thereby, the rod extension spring 288 holds the check valve body in the full open state through the push rod 287.

Incidentally, a spring force of the rod extension spring 288 is set larger than a resultant force obtained from a spring force of the valve opening cancellation spring 256 of the check valve body opening member 251 and a spring force of the aforementioned checking spring so as to have a larger value than a valve opening reaction force of the check valve body opening member 251. As indicated by the solid line in the upper half view of FIG. 21, under the extended condition of the push rod 287, a valve opening advancement distance E between the front surface of the pushing output portion 292 and the rear surface of the insertion locking portion 295 is set longer than the check valve body full opening advancement distance B of the check valve body opening member 51.

For carrying out the valve opening actuation by the aforementioned actuating means 261, it is only necessary to insert the rotatable actuating cylinder 286 and the fore portion of the push rod 287 into the check valve body opening actuating input port 258, and it is not necessary to fixedly secure them to the valve box 204 of the valve assembly by means of screws and so on. Therefore, the valve opening actuation becomes easy. Further, under the valve open condition, since it is possible to always keep the check valve body opening member 251 resiliently urged toward the advancement side by means of the rod extension spring 288, the check valve body can be always full opened with absorbing accumulated errors even though the individual check valve has a proper dimensional error caused by the accumulation of its manufacturing error and assembly error.

Figure 22:
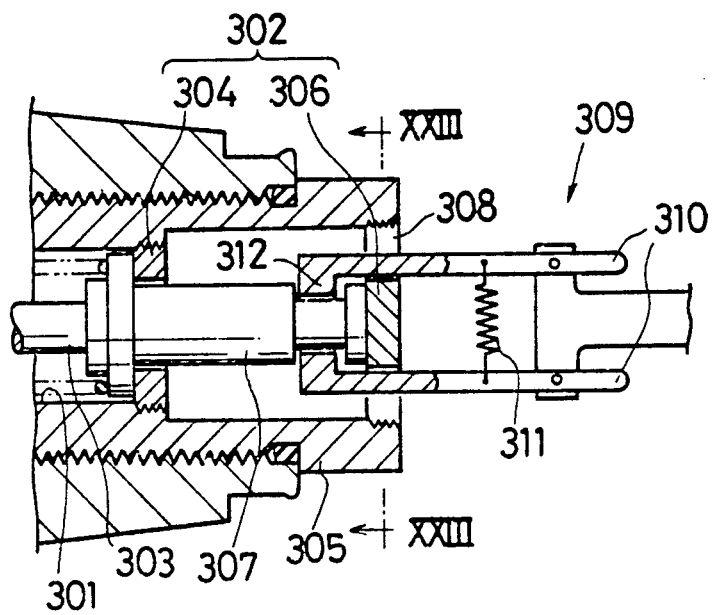
Figure 23:
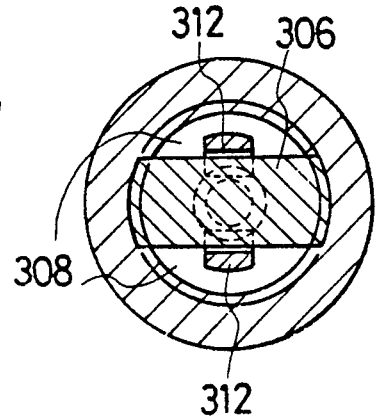

FIG. 22 and FIG. 23 show a fourth variant thereof.

A rear end wall 302 of the valve opening member insertion port 301 is provided with a first wall 304 for limiting a movement of the check valve body opening member 303 and a second wall 306 fixedly secured to the opening portion of the cylinder pressing-down member 305 by screws. The input portion 307 is projected rearward (toward the right side) from the valve opening member 303 so as to pass through the first wall 304, and the arch-shaped valve opening actuating input ports 308, 308 are formed in the upper and lower portions of the second wall 306.

When the check valve body is actuated for valve opening, firstly a pair of upper and lower knobs 310 of the actuating means 309 are pushed inwardly against a tension spring 311 and then upper and lower actuating portions 312 are inserted into the cylinder pressing-down member 305 through the input ports 308. When a hand is released from the knobs 310 under that condition, the actuating portions 312 are engaged with the input portion 307 by a resilient force of the tension spring 311. Under this engaged condition, the valve opening member 303 is pushed forward (toward the left side) by means of the actuating means 309.

In that way, since the input port 308 is formed in such a position as being besides the position facing the input portion 307 of the valve opening member 303, it becomes possible to prevent the valve opening member 303 from being pushed by mistake.

Figure 24:
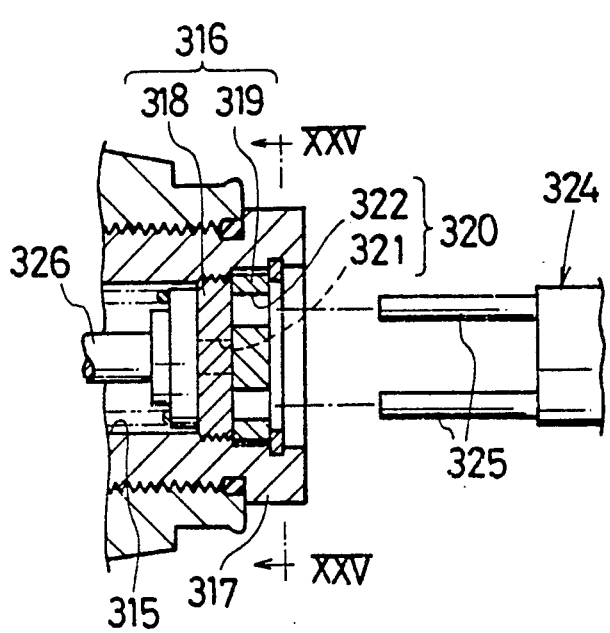
Figure 25:
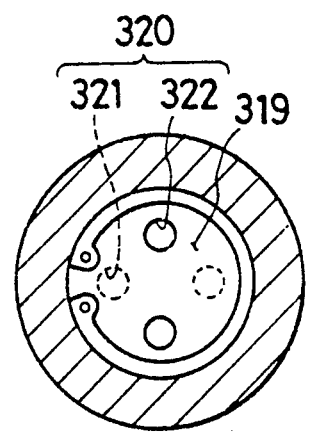

FIG. 24 and FIG. 25 show a fifth variant thereof. Similarly to the above-mentioned fourth variant, the valve opening actuating input port 320 is adapted not to directly face the check valve body opening member 326.

That is, a rear end wall 316 of the valve opening member insertion port 315 is provided with a first wall 318 fixedly secured to the cylinder pressing-down member 317 and a second wall 319 rotatably supported by the cylinder pressing-down member 317. The valve opening actuating input port 320 comprises a pair of first input ports 321 formed as a through-hole in the first wall 318 and a pair of second input ports 322 formed as a through-hole in the second wall 319.

When the check valve body is actuated for valve opening, firstly a pair of actuating rods 325 of the actuating means 324 are inserted into the second input ports 322 and then the second wall 319 is turned so that both the input ports 321, 322 coincides with each other. Subsequently, the actuating rods 325 are inserted into the first input ports 321 so as to push the valve opening member 326 to the left side.

Figure 26:
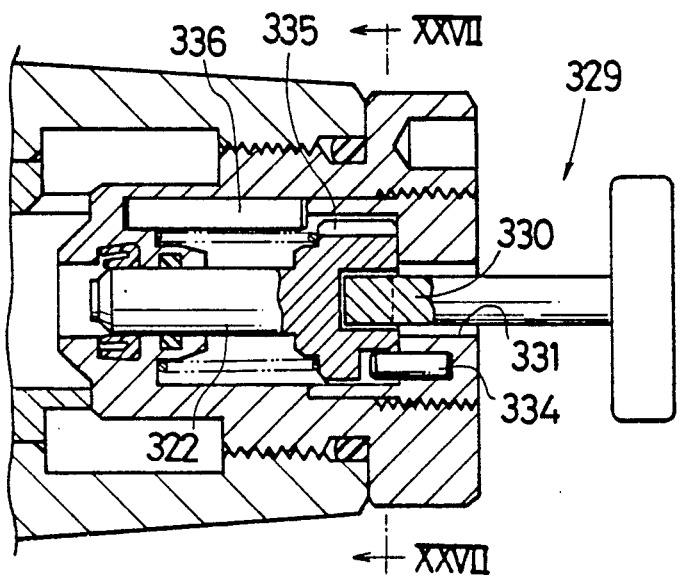
Figure 27:
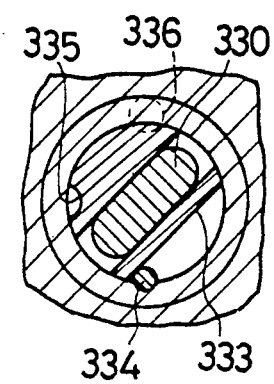

FIG. 26 and FIG. 27 show a sixth variant thereof. FIG. 26 is a view corresponding to FIG. 22, and FIG. 27 is a sectional view showing the condition before the turning operation of the actuating means 329. When the check valve body is actuated for valve opening, firstly a T-shaped actuating portion 330 of the actuating means 329 is inserted into the input port 331 so as to be engaged with the valve opening member 332 and to turn the valve opening member 332 with applying a small pushing force thereto and then the stopper surface 333 of the valve opening member 332 is received by means of a receiving pin 334. At the turning position, an advancement allowing groove 335 of the valve opening member 332 faces an advancement limit pin 336 and is adapted to allow the valve opening member 332 to advance to the left side.

Figure 28:
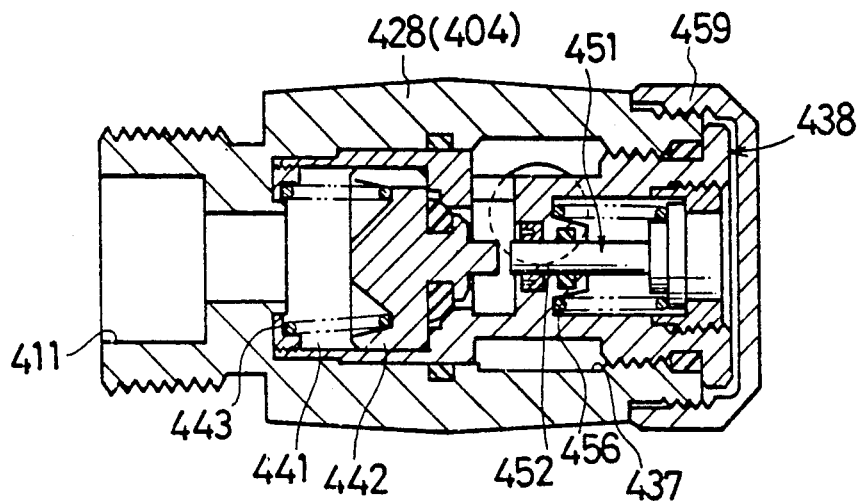

FIG. 28 shows a seventh variant thereof employing a cassette type check valve and a cassette type valve opening member. That is, the check valve mounting hole 437 is formed in the lateral swelled portion 428 of the valve box 404 at the opposed position to the gas outlet port 411, and a cylindrical cassette 438 is detachably and hermetically secured to the mounting hole 437. The check valve chamber 441 and the valve opening member insertion hole 452 are arranged within the cylindrical cassette 438 in order from foreside. The check valve body 442 and the checking spring 443 are mounted within the check valve chamber 441. Further, the check valve body opening member 451 and the valve opening cancellation spring 456 are mounted within the valve opening member insertion hole 452. Since the check valve is constructed as mentioned above, the check valve can be mounted and demounted by only attaching and detaching the cylindrical cassette 438 after the removal of the covering cap nut 459 from the valve box 404 so as to facilitate the maintenance.

Figure 29:
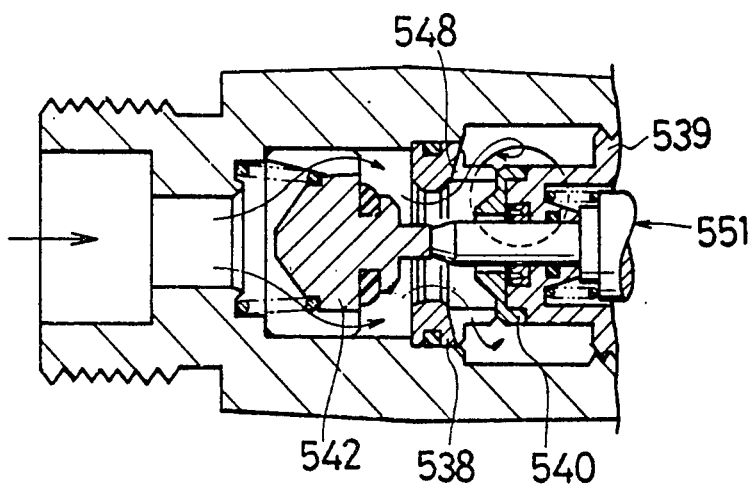

FIG. 29 shows an eighth variant thereof and is a partial view showing the gas charging condition.

This variant is so constructed that the charging time can be further shortened by lessening a flow resistance of a gas at the time of gas charging. That is, a tapered guide cylinder 540 is mounted between the valve seat cylinder 538 and the cylinder pressing-down member 539. A plurality of circumferential wall grooves 548 are formed in the rear portion of the valve seat cylinder 538 in a tapered configuration conforming with the front surface of the guide cylinder 540. Further, the check valve body opening member 551 has a taper surface formed at its fore portion so as to be gradually contracted forward. Therefore under the valve opened condition that the check valve body 542 is opened by means of the check valve body opening member 551, since the charge gas flows smoothly as indicated by the arrows, the flow resistance can be small and the gas charging time can be shortened.

<Third Embodiment>

Figure 30A:
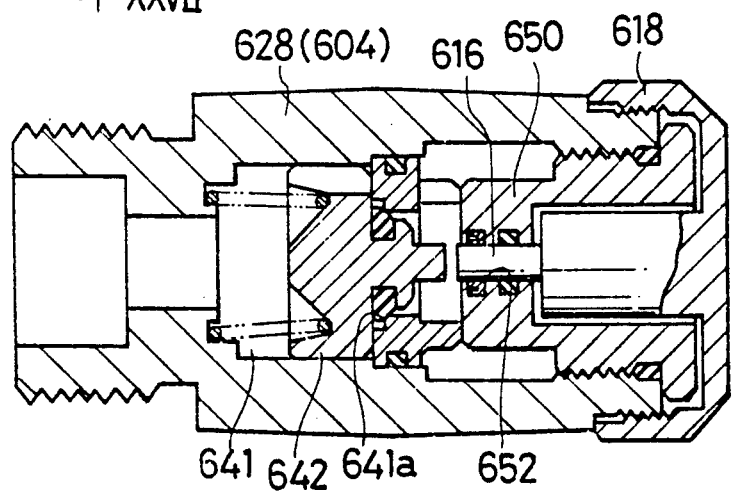
FIG. 30(a) is a view corresponding to FIG. 2.
Figure 30B:
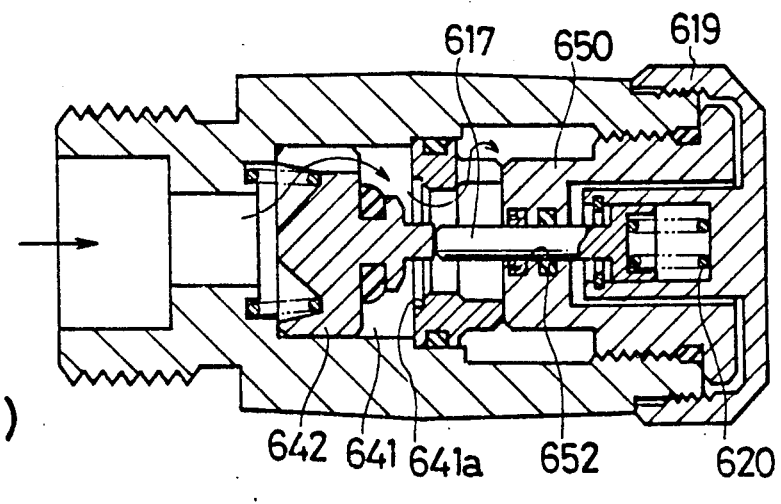
FIG. 30(b) is a view corresponding to FIG. 7.

FIG. 30 shows a third embodiment, FIG. 30(a) is a view corresponding to FIG. 2, and FIG. 30(b) is a view corresponding to FIG. 7.

In this embodiment, the valve opening rod insertion hole 652 is formed in an end wall 650 facing the check valve chamber 641 from the side of the check valve chamber inlet 641a. A hole closing short plug 616 and a check valve body opening long rod 617 are adapted to be selectively replaced relative to the valve opening rod insertion hole 652.

Under the gas takeout condition shown in FIG. 30(a), a gas takeout cap nut 618 is mounted to the rear portion of the lateral swelled portion 628 of the valve box 604 and the plug 616 projected from the foreside thereof is inserted into the valve opening rod insertion hole 652.

Under the gas valve open condition shown in FIG. 30(b), a valve opening cap nut 619 instead of the gas takeout cap nut 618 is mounted to the rear portion of the lateral swelled portion 628 and the check valve body 642 is opened by means of a valve opening rod 617 provided in the central portion thereof. The valve opening rod 617 is resiliently urged forward by means of an extension spring 620 so as to keep the check valve body 642 in the full opened state.

<Fourth Embodiment>

Figure 31:
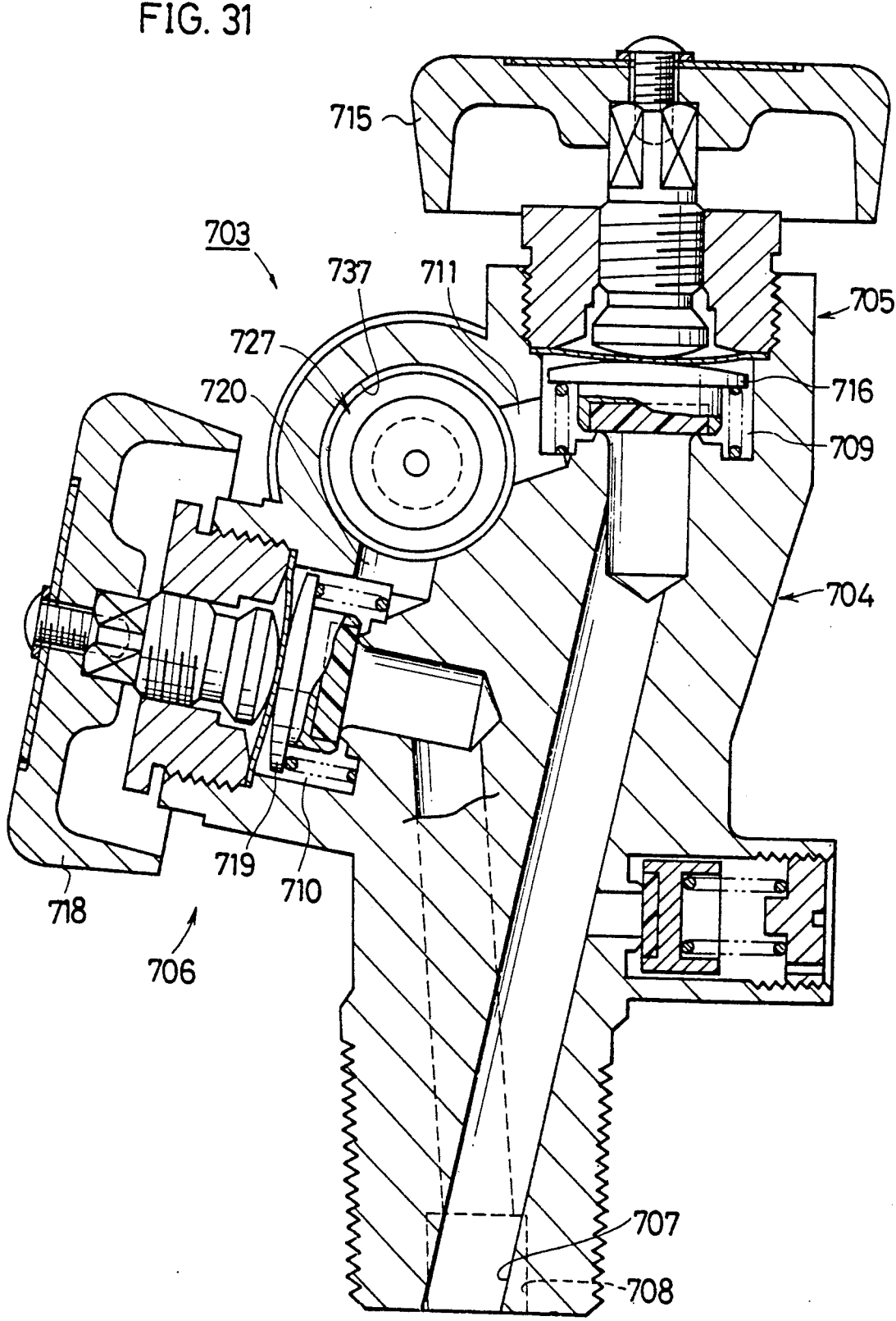
Figure 32:
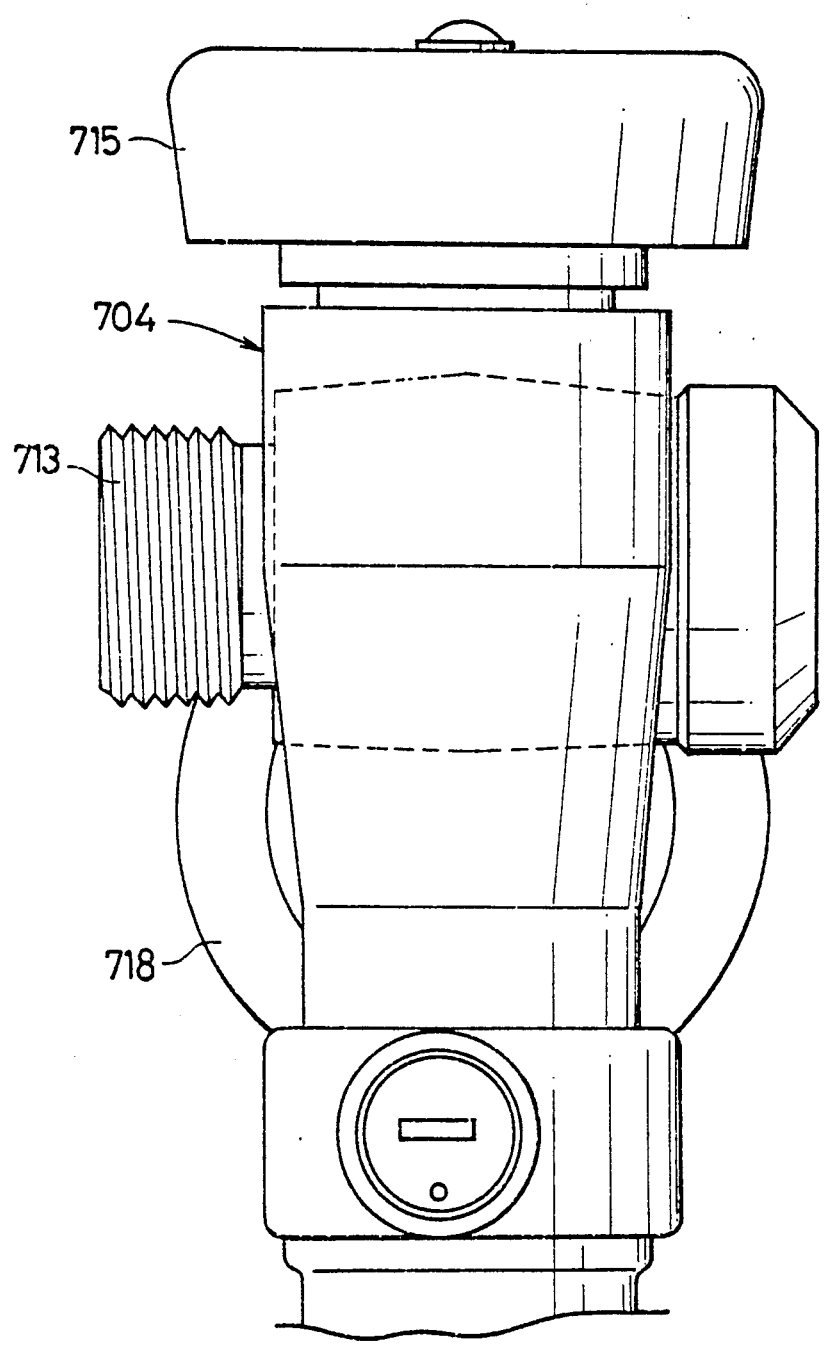

FIG. 31 and FIG. 32 show a fourth embodiment.

FIG. 31 is a vertical sectional view of the valve assembly for the gas container, and FIG. 32 is a partial view in view of right side thereof.

The valve assembly 703 is utilized for a comparatively large gas container and has such a construction that both a gas takeout and a liquid takeout can be done by only one valve assembly while the gas container is kept in the upright posture. Within the valve box 704 there are provided the gas takeout stop valve 705 and a liquid takeout stop valve 706.

Each of these stop valves 705, 706 is constructed substantially the same as that employed in the aforementioned valve assembly for the gas container. That is, the gas stop valve chamber 709 is formed in the upper portion of the valve box 704 in the upward open state, and a liquid stop valve chamber 710 is formed in the midway height portion of the valve box 704 in the laterally upward open state. The check valve mounting hole 737 is formed in the portion between both these valve chambers 709, 710. The gas inlet port 707 and a liquid inlet port 708 are opened in the bottom surface of the threaded foot portion of the valve box 704. A liquid discharge pipe (not illustrated) is attached to the liquid inlet port 708 so as to run into the gas container.

By manipulating the handle wheel 715 of the gas takeout stop valve 705 so as to open the stop valve body 716, the gas within the gas container is taken out from the gas outlet port of the gas outlet nozzle 713 via the gas inlet port 707, the gas stop valve chamber 709, the gas outlet passage 711 and the check valve 727.

Further, by manipulating a handle wheel 718 of the liquid takeout stop valve 706 so as to open a stop valve body 719, a liquid within the gas container is taken out from the gas outlet port of the outlet nozzle 713 via the liquid inlet port 708, the liquid stop valve chamber 710, a liquid outlet passage 720 and the check valve 727.

Although the present invention has been described by reference to particular illustrative examples it will be understood that variations and modifications are possible within the invention concept.

What is claimed is:

1. In a valve assembly with a check valve for a gas container, including a valve box, a gas inlet port and a gas outlet port connected in communication with each other through a gas inlet passage, a stop valve chamber having a circumferential wall and a gas outlet passage serially arranged within said valve box, said stop valve chamber accommodating a stop valve body adapted to be opened and closed relative to a stop valve seat through a stop valve opening and closing manipulation means; in a portion of a gas passage running from the stop valve chamber to the gas outlet port through the gas outlet passage there being provided a check valve chamber having an inlet, said check valve chamber accommodating a check valve body resiliently forced to a check valve seat by means of a checking spring; under the open condition in which the stop valve body is opened by means of the stop valve opening and closing manipulation means, when a residual pressure within a gas container is higher than a predetermined pressure, a gas within the gas container is adapted be discharged to the gas output port by separating the check valve body from the check valve seat against a valve closing force of the checking spring by means of the residual pressure; when the residual pressure within the gas container lowers to the predetermined pressure, the residual pressure is kept at the predetermined pressure by keeping the check valve body in sealing contact with the check valve seat by means of the valve closing force of the checking spring; and when a reverse flow gas flows into the check valve chamber form the gas outlet port, in addition to the valve closing force of the checking spring, a pressure of the reverse flow gas acts on the check valve body as a valve closing force to keep the check valve body in sealing contact with the check valve seat and prevents the reverse flow gas from reversely flowing from the check valve seat into the gas inlet port through the stop valve chamber, the improvement of said valve assembly with a check valve for a gas container comprising:

said check valve chamber being located in the circumferential wall of the stop valve chamber;

the inlet of said check valve chamber is opened by movement of said check valve body toward said outlet port against the closing force exerted by the checking spring; and a check valve body opening member is provided for valve opening actuation of said check valve body; said check valve body opening member being adapted to engage the check valve body from the inlet side of the check valve chamber, said check valve body opening member is adapted to be changed over between a valve open position where said check valve body opening member shifts the check valve body by the advancement of the check valve body opening member within the check valve chamber and a valve opening cancellation position where the check valve body opening member is retracted from the check valve chamber.

2. A valve assembly with a check valve for a gas container as set forth in claim 1, further including:

a valve opening member insertion hole is located in an end wall of the check valve facing the check valve chamber from the side of the check valve chamber inlet;

the check valve body opening member being hermetically and movably inserted and retracted through the valve opening member insertion hole as the check valve body opening member is moved between its valve open position and valve opening cancellation position respectively;

the check valve body opening member being resiliently urged by means of a valve opening cancellation spring to retreat toward the valve opening cancellation position and is adapted to abut against a rear end wall of the valve box to prevent the retreating movement distance thereof from becoming longer than a predetermined distance; and a check valve body opening actuating means for shifting said check valve body opening member, said check valve body opening actuating means including a valve opening actuation input port located in the rear end wall.

3. A valve assembly with a check valve for a gas container as set forth in claim 2, wherein;
when the valve assembly is viewed under its longitudinally disposed condition, the gas inlet port is opened to a lower surface portion of the valve box; the stop valve chamber is formed in the upper portion of the valve box and is adapted to be opened upward; and the check valve chamber and the gas outlet port are arranged side by side, coaxially and horizontally in a lateral portion of the valve box, outside the stop valve chamber.

4. A valve assembly with a check valve for a gas container as set forth in claim 2, wherein;
the check valve body opening member is adapted to be changed over to the valve open position and to the valve opening cancellation position by means of a check valve body opening hydraulic actuating means, and an input portion of the check valve body opening member is formed by a hydraulic actuation piston,
a valve opening actuation chamber being disposed between the piston type input portion and the rear end wall of the valve box,
the check valve body opening actuation input port is formed by a pressurized fluid passage, and
the valve opening actuation chamber is communicated with the outside of the rear end wall through the input port composed of the fluid passage.

5. A valve assembly with a check valve for a gas container as set forth in claim 4, wherein;
the input port composed of the fluid passage is formed in an inclined state relative to the axis of the input portion of the check valve body opening member.

6. A valve assembly with a check valve for a gas container as set forth in claim 2, wherein;
a check valve mounting hole is formed in the valve box to be opened at the position opposed to the gas outlet port, and a cylindrical cassette for mounting the check valve is detachably and hermetically inserted into the check valve mounting hole, and
the check valve chamber is formed in the cylindrical cassette, and the check valve body and the checking spring are mounted within the check valve chamber.

7. A valve assembly with a check valve for a gas container as set forth in claim 2, wherein;
a check valve mounting hole is formed in the valve box to be opened at the position opposed to the gas outlet port, and a cylindrical cassette for mounting the check valve is detachably and hermetically inserted into the mounting hole, and
the check valve chamber and the valve opening member insertion hole are formed in the cylindrical cassette, and
the check valve body and the checking spring are mounted in the check valve chamber, and the check valve body opening member and the valve opening cancellation spring are mounted within the valve opening member insertion hole.

8. A valve assembly with a check valve for a gas container as set forth in claim 2, wherein;
the check valve body opening member is adapted to be changed over to the valve opening cancellation position and the valve open position by means of the check valve body opening actuating means, and
the valve opening actuation input port is formed so that the output portion of the actuating means can be removably inserted into the valve box.

9. A valve assembly with a check valve for a gas container as set forth in claim 8, wherein;
the valve opening actuation input port is formed at a position offset from the longitudinal axis of the check valve body opening member.

10. A valve assembly with a check valve for a gas container as set forth in claim 1, wherein;
the check valve body opening member comprises a check valve body opening rod and a plug,
a valve opening rod insertion hole is opened in an end wall of the check valve facing the check valve chamber inlet, the check valve body opening rod and the plug are adapted to be exchangeably mounted in the valve opening rod insertion hole,
under such a condition that the check valve body opening rod is inserted into the valve opening rod insertion hole, the check valve body is opened by means of the check valve body opening rod, and
under such a condition that the plug is attached to the valve opening rod insertion hole, the valve opening of the check valve body is cancelled and provided is the valve opening cancellation condition in which the valve opening rod insertion hole is closed by means of the plug.

* * * * *